United States Patent [19]

Malloy

[11] 3,890,840

[45] June 24, 1975

[54] LASER CONTROLLED FATHOMETER

[75] Inventor: Richard J. Malloy, Ojai, Calif.

[73] Assignee: The United States of America as represented by the Secretary of the Navy, Washington, D.C.

[22] Filed: June 7, 1974

[21] Appl. No.: 477,250

[52] U.S. Cl............. 73/290 V; 73/432 L; 340/3 R; 356/172
[51] Int. Cl....................... G01b 11/26; G01f 23/00
[58] Field of Search.. 73/290 R, 290 V, 305, 432 L, 73/DIG. 11; 356/3, 172, 247

[56] References Cited
UNITED STATES PATENTS

| | | | |
|---|---|---|---|
| 3,372,584 | 3/1968 | Jageler................................... | 73/152 |
| 3,637,309 | 1/1972 | Hosterman.......................... | 356/172 |

Primary Examiner—Jerry W. Myracle
Assistant Examiner—John S. Appleman
Attorney, Agent, or Firm—Richard S. Sciascia; J. M. St. Amand; Darrell E. Hollis

[57] ABSTRACT

In a method and apparatus for underwater depth recording, a laser beam placed on a datum point impinges upon a plurality of vertically adjacent laser beam receptor cells rigidly affixed to a float. A depth sounding transducer is supported a fixed distance under the float and communicates with a recorder. A plurality of delay circuits respectively connected to the plurality of receptor cells delays a signal from the transducer to the recorder a specific time indicative of the position of the plurality of receptor cells with respect to said datum point whereby an underwater depth recording is made without errors being introduced by surface water disturbances.

7 Claims, 3 Drawing Figures

LASER CONTROLLED FATHOMETER

BACKGROUND OF THE INVENTION

1. Field of the Invention

The present invention relates generally to underwater depth recording methods and apparatus and more particularly to a laser controlled underwater depth recording method and apparatus.

2. Description of the Prior Art

Some prior art surveying systems have utilized laser beams to create horizontal datums for measuring height difference between two selected points on a terrain. However, no provisions are taken to compensate for vertical movement of a measuring device at either of the two selected points. Also, such prior art survey systems are not adaptable for acceptable use underwater since light tends to rapidly disperse in an underwater environment and often water conditions are such that light transmission is totally inhibited.

SUMMARY OF THE INVENTION

The general purpose of the present invention is to provide a laser controlled underwater depth recording method and apparatus that is capable of compensating for the vertical movement of a measuring device located in the water while utilizing the laser beam above the water's surface to establish a datum. To attain this, the present invention provides a laser placed upon a datum point and directs its laser beam in a horizontal plane to impinge upon a plurality of vertically adjacent receptor cells rigidly affixed to a float. A depth sounding transducer is supported a fixed distance under the float and communicates with a recorder. A plurality of delay circuits respectively connected to said plurality of receptor cells delay a signal from the transducer to the recorder a specific time indicative of the position of said plurality of receptor cells with respect to said datum point.

OBJECTS OF THE INVENTION

Accordingly, it is one object of the present invention to provide compensation for the vertical movement of a measuring device located in water.

Another object of the present invention is to provide depth recordings.

Another object of the present invention is to utilize a laser beam as a datum above the water's surface.

Another object of the present invention is to make measurements with great and consistent accuracy.

Another object of the present invention is to provide an accurate depth recording under all water conditions.

Another object of the present invention is to provide a depth recording in which the elements most susceptible to human error are automated.

Another object of the present invention is to provide a depth recording system which is simple in operation and results in the rapid surveying of the bottom of a body of water.

Another object of the present invention is to provide a depth recording which is unaffected by light conditions and which can be made at night.

Other objects and a more complete appreciation of the present invention and its many attendant advantages will develop as the same becomes better understood by reference to the following detailed description when considered in conjunction with the accompanying drawings wherein like reference numerals designate like parts throughout the figures thereof and wherein:

DETAILED DESCRIPTION OF THE PREFERRED EMBODIMENT

Figure 1:
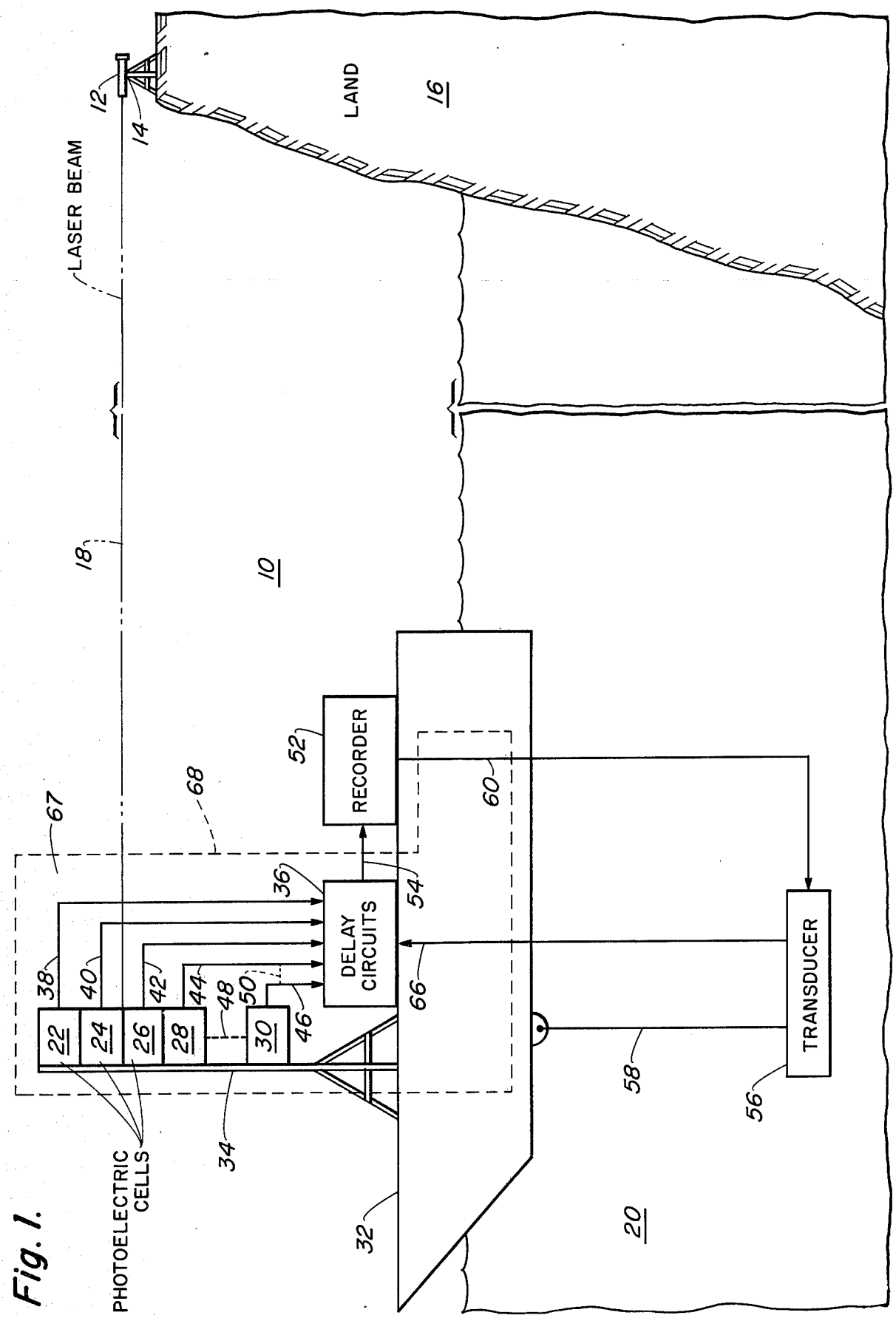
FIG. 1 is a schematic illustration of the arrangement and manner of using a specific embodiment of the present invention.

In FIG. 1, laser controlled fathometer 10 comprises laser 12 positioned on datum point 14. Datum point 14 is located on land 16. Laser beam 18 projects outward over water 20 in horizontal plane 100 of FIG. 2.

A series of laser beam receptor cells 22, 24, 26, 28 and 30 are rigidly affixed to float 32 by support means 34. Receptor cells 22, 24, 26, 28 and 30 are photoelectric cells. Receptor cells 22, 24, 26, 28 and 30 are connected to delay circuits 36 by lines 38, 40, 42, 44 and 46. As indicated by dotted lines 48 and 50, there may be any number of receptor cells.

Delay circuits 36 are connected to recorder 52 via line 54.

A depth sounding transducer 56 is supported from float 32 under water 20 by line 58. Transducer 56 is a fixed distance from float 32. Transducer 56 is a sonar sounding device that transmits a sound signal which bounces off the bottom. Transducer 56 then receives the rebounded signal.

Recorder 52 is connected to transducer 56 via line 60. Transducer 56 is connected to delay circuits 36 via line 66.

The method of operation of the specific embodiment of FIG. 1 is as follows: Laser beam 18 impinges upon one of receptor cells 22 – 30. At a specific time, recorder 52 is actuated. When actuated, recorder 52 signals transducer 56 via line 60 to transmit a sound pulse. Recorder 52 has an arm which moves with respect to a recording paper. The arm triggers and marks near the top of the recording paper upon the transmission of a sound pulse from transducer 56 and marks again upon the reception of the sound pulse having returned to transducer 56 after bouncing off the ocean bottom, plus any delay added by delay circuits 36. The arm marks the recording paper at the commencement and return (plus any delay) of the sound pulse. The distance moved by the arm between marks is a linear function of the depth of the ocean at a specific point with respect to datum point 14. It will be appreciated by those having ordinary skill in the art that a conventional depth recorder, such as recorder 52, has programming circuitry which prevents recording any erroneous signals that might appear on line 66. When the signal rebounds from the bottom, transducer 56 receives it and transmits it to delay circuits 36 via line 66. Delay circuits 36 delay the transmission of the signal on line 66 to recorder 52 a specific time. This specific time is determined by which receptor cell laser beam 18 is impinging upon. If laser beam 18 is impinging upon receptor cell 30, then a zero second delay is introduced. The time delay varies linearly from zero for receptor cell 30 to two milliseconds for receptor cell 22 in increments. Each receptor cell has a specific time delay associated with it. Thus, a time delay is introduced that is a function of the position of receptor cells 22 – 30 relative to datum point 14. In FIG. 1, receptor cell 30 is two and one-half feet vertically below datum point 14 due to surface disturbances. The proper depth is recorded, however, because receptor cell 26, which laser beam 18 impinges upon, causes delay circuits 36 to introduce a 1 millisecond delay. One millisecond of time is required for sound to travel 5 feet in water. This is based on a sound velocity propagation of 5000 feet per second, typical for waters of the surf zone in Southern California on a warm summer day. It is imperative that transducer 56 and receptor cells 22 – 30 be rigidly fixed so that both transducer 56 and receptor cells 22 – 30 rise and fall together with float 32. Receptor cells 22 – 30 are vertically adjacent to each other.

It is noted that the elements enclosed by broken line 68 comprise detector means 67 for receiving laser beam 18, indicating the position of detector means 67 with respect to datum point 14, and for delaying the recording of a received signal from transducer 56 for a specific time.

After the introduced delay, the signal is transmitted to recorder 52 via line 54. Recorder 52 records the depth.

Figure 2:
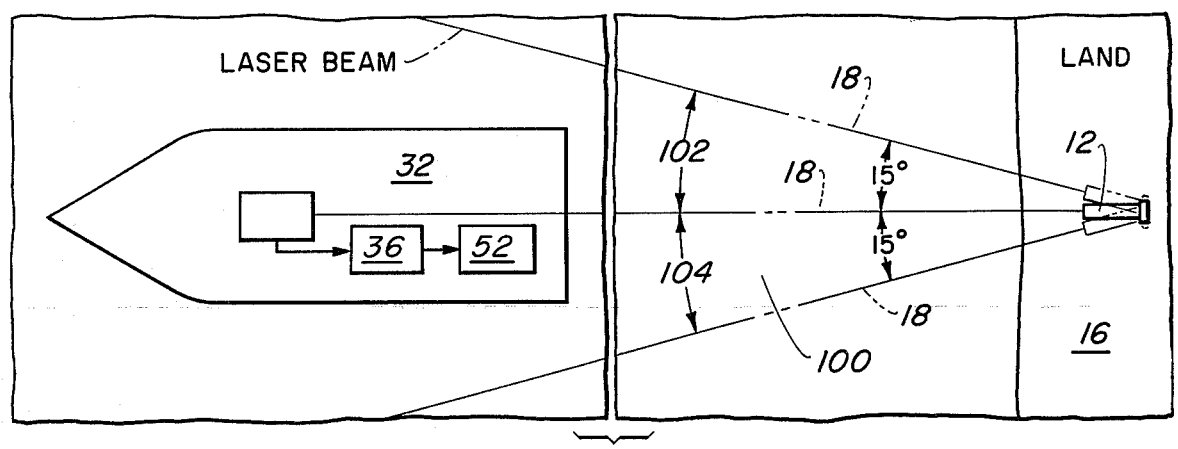
FIG. 2 is a top view of FIG. 1.

Of course, if laser controlled fathometer 10 is to be utilized in an underwater survey system, a method of recording the position of transducer 56 with respect to a reference point, such as datum point 14, in horizontal plane 100 of FIG. 2 is required.

Now turning to FIG. 2, laser beam 18 is constrained to sweep out a thirty degree arc in a horizontal plane. Arcs 102 and 104 together comprise a thirty degree arc. The sweep rate is so fast as not to interfere with the recording operation. That is, laser beam 18 sweeps a sufficient number of times between transmission by transducer 56 to ensure that during some part of the time period of the received signal from transducer 56 on line 66 that a signal appears on one of lines 38 – 46 to delay circuits 36.

Figure 3:
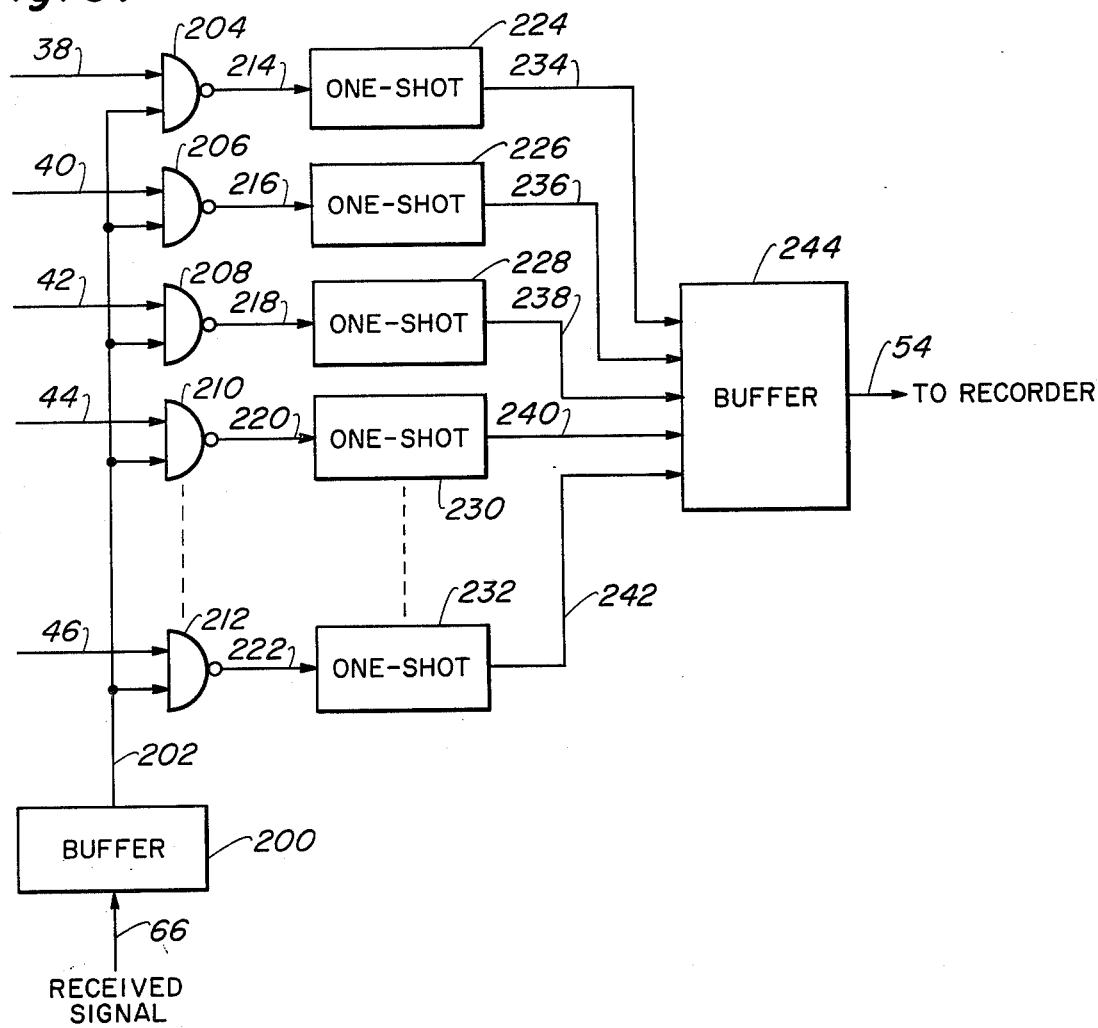
FIG. 3 is a schematic diagram of the delay circuits of FIG. 1.

FIG. 3 is a schematic of the circuit of delay circuits 36 of FIG. 1. Line 66 inputs buffer 200. Buffer 200 is connected to NAND gates 204 – 212 via line 202. Lines 38 – 46 input NAND gates 204 – 212, respectively. NAND gates 204 – 212 are connected to one-shots 224 – 232, respectively, via lines 214 – 222. One-shot 224 is connected to buffer 244 via line 234. One-shot 226 is connected to buffer 244 via line 236. One-shot 228 is connected to buffer 244 via line 238. One-shot 230 is connected to buffer 244 via line 240. One-shot 232 is connected to buffer 244 via line 242.

One-shots 224 – 232 each have a different time period, thus providing the necessary time delay. One-shot 232 has a zero time delay while one-shot 244 has a 2 millisecond time delay.

When a received signal from transducer 56 appears on line 66, a signal from one of receptor cells 22 – 30 appears on one of lines 38 – 46. Assume, for example, that laser beam 18 impinges on receptor cell 26 when the received signal appears on line 66. A signal then appears on line 42 and 202, causing NAND gate 208 to trigger one-shot 228. On the trailing edge of the pulse from one-shot 228 on line 238, recorder 52 records. Thus, the recording of the received signal on line 66 is delayed a specific time equal to the time period of one-shot 228.

It is noted that the time periods of one-shots 224 – 232 are related to the distance of each respective receptor cell 22 – 30 from datum point 14. The relationship is incrementally linear. That is, as the receptor cells 22 – 30 are scanned from 30 to 22, their corresponding one-shots 224 – 232 will introduce incremental, linearly increasing time delays. For example, the time delay of one-shot 228 is a specific incremental time greater than the time delay of one-shot 230 and the same specific incremental time less than the time delay of one-shot 226.

It is noted that for proper operation of the present invention receptor cells 22 – 30 must continually intersect the horizontal plane in which laser beam 18 sweeps. If receptor cells 22 – 30 are above or below the horizontal plane at any time, and a received signal appears on line 66, then an erroneous depth recording will occur.

It will be appreciated by those skilled in the art that the complete circuit diagram of FIG. 3 includes such suitable and necessary biasing voltage sources as are usually provided in such circuits.

Obviously, many modifications and variations of the present invention are possible in light of the above teachings. It is therefore to be understood that within the scope of the appended claims the invention may be practiced otherwise than as specifically described.

I claim:

1. A laser controlled fathometer comprising:
   a. means placed on a datum point for generating a laser beam in a horizontal plane;
   b. a depth sounding transducer for transmitting and receiving a sonar signal;
   c. means for supporting said transducer a fixed distance under the surface of a body of water;
   d. a recorder communicating with said transducer; and
   e. detector means affixed to said transducer support means and communicating with said recorder for receiving said laser beam at one of a plurality of laser beam receptor cells thereon indicative of the position of said detector means with respect to said datum point and for delaying the recording of a received signal from said transducer for a specific time.

2. The fathometer of claim 1 wherein said specific time delay produced by said detection means is a linear function of the position of said detection means with respect to said datum point.

3. The fathometer of claim 1 wherein said laser beam reception cells of said detector means are disposed in a line generally normal to the plane of said laser beam.

4. The fathometer of claim 1 wherein said detector means includes:
   a. a plurality of laser beam receptor cells being disposed in abutting side-by-side relation to be in a line generally normal to the plane of said laser beam, said plurality of receptor cells including a first and a last receptor cell; and
   b. a plurality of delay circuits respectively connected to said plurality of receptor cells, each said delay circuit being connected to said depth sounding transducer for receiving said received signal therefrom, whereby the recording of said received signal is delayed said specific time.

5. The fathometer of claim 4 wherein said plurality of delay circuits provide a linearly incremental graduated spectrum of delays between a zero delay and a maximum delay.

6. The fathometer of claim 5 wherein said plurality of delay circuits are respectively connected to said plurality of laser beam receptor cells in such manner that as said laser beam is received by each said receptor cell sequentially from said first receptor cell to said last receptor cell, said plurality of delay circuits, respectively, will be sequentially actuated to provide said linearly graduated spectrum of delays, starting at said zero delay and progressing sequentially to said maximum delay.

7. A method of determining underwater depths comprising the steps of:

a. positioning a laser on a datum point;

b. attaching a plurality of vertically adjacent laser beam receptor cells to a float;

c. hanging a depth sounding transducer from said float a fixed distance under the water, said transducer communicating with a recorder for recording signals from said transducer, directing, in a horizontal plane, said laser beam to impinge upon said receptor cells; and d. delaying the recording of said signals from said transducer a specific time indicative of the position of said receptor cells with respect to said datum point.

* * * * *